Oct. 17, 1950           H. N. WILLIAMS           2,526,182
HYDRAULICALLY CONTROLLED LIVE CENTER
Filed Aug. 7, 1945           2 Sheets-Sheet 2
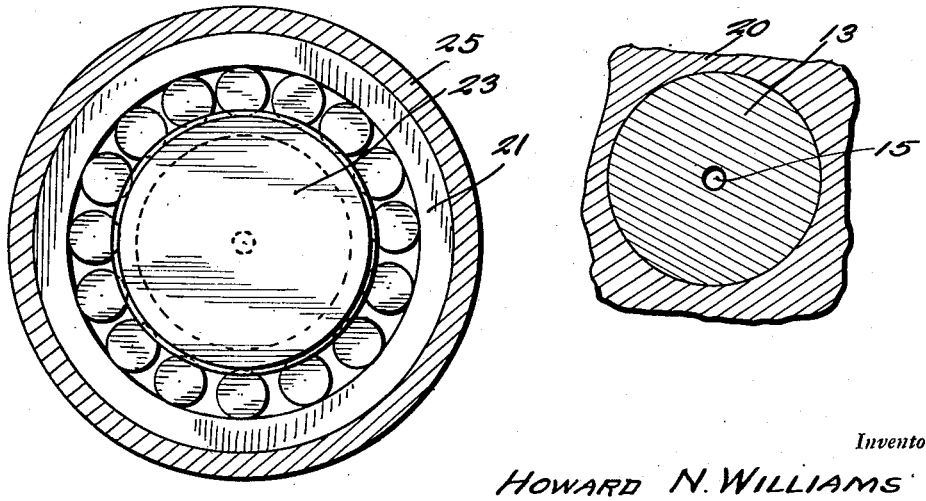
Inventor
HOWARD N. WILLIAMS
By Clarence A. O'Brien
and Harvey B. Jacobson
Attorneys Patented Oct. 17, 1950

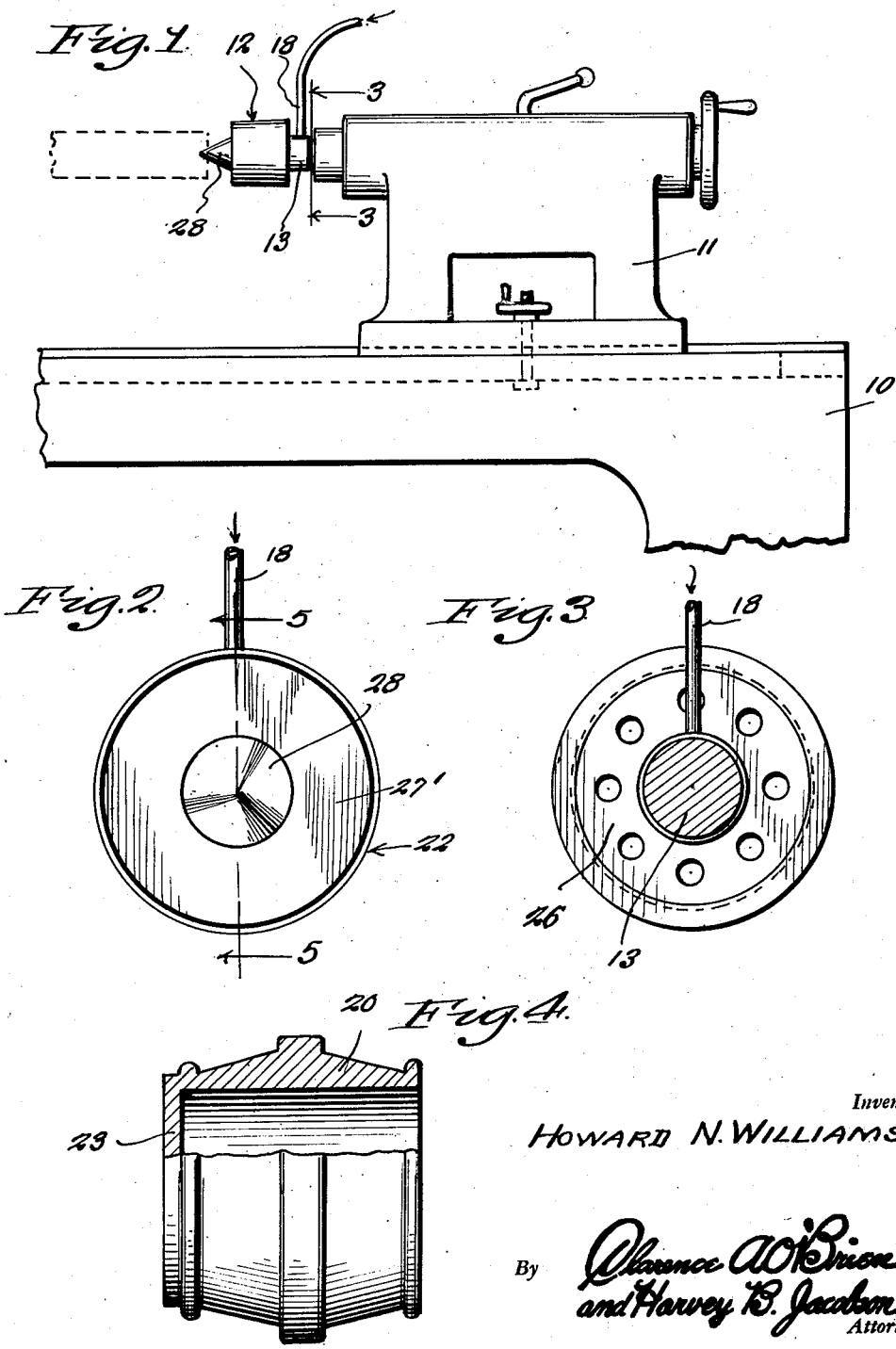

2,526,182

UNITED STATES PATENT OFFICE 2,526,182

HYDRAULICALLY CONTROLLED LIVE CENTER

Howard N. Williams, Lawrence, Kans., assignor of fifty per cent to Harry R. Koblitz, Lawrence, Kans.

Application August 7, 1945, Serial No. 609,339

5 Claims. (Cl. 82—31)

This invention relates to live centers for machines such as lathes, and has for its primary object to advance the live center into contact with the work under fluid pressure, preferably employing an hydraulic fluid.

Another object of the invention is an anti-friction live center capable of being mounted on standard machine equipment.

The above and other objects may be attained by employing this invention which embodies, among its features, a spindle adapted to be introduced into the usual tail stock of a lathe or like tool, an anti-friction bearing slidable longitudinally with relation to the tail stock and spindle, a live center carried by the anti-friction bearing and means to introduce fluid under pressure into the interior of the device to cause the anti-friction bearing and the live center to be advanced toward the work.

In the drawings—

Figure 1 is a fragmentary side view of the lathe showing a tail stock equipped with my improved hydraulically controlled live center, Figure 2 is a front view in elevation of the live center, Figure 3 is a vertical sectional view taken substantially on the line 3—3 of Figure 1, Figure 4 is a side view of the inner race of the anti-friction bearing showing the same modified for use in connection with my invention, Figure 5 is a fragmentary enlarged sectional view taken substantially on the line 5—5 of Figure 2, Figure 6 is a sectional view taken substantially on the line 6—6 of Figure 5, and Figure 7 is a fragmentary sectional view taken substantially on the line 7—7 of Figure 5.

Referring to the drawings in detail, a lathe designated 10 is provided with the usual tail stock 11 upon which my improved live center designated generally 12 is supported in the customary manner.

The live center 12 above referred to comprises a spindle 13, the shank of which is adapted to be received in the tail stock 11 in the conventional manner. Formed in the projecting end 14 of the spindle 13 is a longitudinal bore 15 which opens out through the end of the outer end of the spindle and communicates at its inner end with a radial bore 16 provided with internal screw threads 17 into which a feed pipe 18 is threadedly received. Formed on the spindle 13 near the radial bore 16 is an outwardly extending annular flange 19, the purpose of which will more fully hereinafter appear.

Mounted for longitudinal movement on the end 14 of the spindle is the inner race 20 of an anti-friction bearing, the outer race 21 of which supports a live spindle designated generally 22. Closing the outer end of the inner race 20 is a head 23 which cooperates with the end of the spindle 13 in forming a chamber 24 with which communication is established through the passage 15.

The live spindle 22 comprises an outer cylindrical shell 25 carrying adjacent its inner end internal screw threads into which a retaining ring 26 is threadedly received. As shown, this retaining ring is provided with an inwardly extending annular flange 27 which rides against the flange 19 in order to limit endwise movement of the live center 22. The end of the cylindrical shell 25 opposite that provided with the internal screw threads is closed by an end closure 27' carrying an outwardly projecting axially aligned conical point 28 for engagement with the work.

In operation, the device is mounted in a lathe, as suggested in Figure 1, and the nipple 18 is connected with a suitable source of fluid pressure. The fluid entering the feed pipe 18 will flow through the passage 16 into the longitudinal bore 15 so as to build up pressure within the chamber 24, thus causing the head 23 to move the inner race 20 of the bearing longitudinally on the spindle 13, so as to advance the point 28 into contact with the work. By regulating the degree of pressure admitted to the feed pipe 18, it is obvious that the pressure exerted on the work by the point 28 will also be controlled. While in most instances I prefer to employ a liquid so as to place the parts under positive pressure, I may find it desirable in certain instances to employ air or gas under pressure as the fluid, in which event a cushioning effect of the center 28 against the work may be had.

While in the foregoing there has been shown and described the preferred embodiment of this invention, it is to be understood that minor changes in the details of construction and combination and arrangement of parts may be resorted to without departing from the spirit and scope of the invention as claimed.

Having thus described the invention, what I claim is:

1. A controllable live center which includes a spindle having an axial bore entering one end and a radial bore communicating with the inner end of the axial bore, means to introduce fluid under pressure into the bores, an anti-friction thrust bearing encircling the spindle between the radial bore and the end of the spindle through which the axial bore opens, a head closing the end of the anti-friction bearing adjacent the end of the spindle through which the axial bore opens, and a live center carried by the anti-friction bearing.

2. A controllable live center which includes a spindle having an axial bore entering one end and a radial bore communicating with the inner end of the axial bore through which fluid under pressure is admitted to the axial bore, an anti-friction thrust bearing encircling the spindle between the radial bore and the end of the spindle through which the axial bore opens, a head closing the end of the anti-friction bearing adjacent the end of the spindle through which the axial bore opens, a live center carried by the anti-friction bearing, and a pipe communicating with the radial bore in the spindle through which fluid under pressure may be admitted to the bores and between the head and the end of the spindle.

3. In a live center, a spindle, an inner anti-friction bearing race mounted on the spindle to move longitudinally thereon adjacent an end thereof, a head closing the end of the bearing race adjacent the said end of the spindle and forming with said end of the spindle a chamber, an outer anti-friction bearing race mounted on the inner anti-friction race to rotate therearound, work supporting means carried by the outer anti-friction bearing race, means to admit fluid into the chamber to move the work supporting means longitudinally on the spindle, a stop flange on the spindle remote from the chamber, and a retaining ring carried by the work supporting means adjacent the end thereof remote from the chamber for engaging the stop flange and limiting the movement of the work supporting means under the influence of fluid entering the chamber.

4. A live center comprising a spindle having a cylindrical end with an axial bore opening through said end, a cylindrical inner bearing race slidable on said end, a head closing the end of said inner bearing cylinder thereby forming a cylinder with said end acting as a piston, an outer bearing race radially spaced from said inner bearing race, bearings located between said races, and work supporting means supported by said outer bearing race and located outwardly of said closed end, whereby pressure admitted through said axial bore will move said outer bearing race and said work support toward the work.

5. A live center comprising a spindle having a cylindrical end with an axial bore opening through said end, a cylindrical inner bearing race slidable on said end, a head closing the end of said inner bearing cylinder thereby forming a cylinder with said end acting as a piston, an outer bearing race radially spaced from said inner bearing race, bearings located between said races, a head closing said outer bearing race and positioned outwardly of said first-mentioned head and a work support supported centrally of said head, whereby pressure admitted through said axial bore will move said outer bearing race and said work support toward the work.

HOWARD N. WILLIAMS.

REFERENCES CITED

The following references are of record in the file of this patent:

UNITED STATES PATENTS

| Number | Name | Date |
| --- | --- | --- |
| 1,821,331 | Svenson | Sept. 1, 1931 |
| 1,993,809 | Schnelle | Mar. 12, 1935 |
| 2,313,963 | Patrick | Mar. 16, 1943 |
| 2,402,979 | Barto | July 2, 1946 |

FOREIGN PATENTS

| Number | Country | Date |
| --- | --- | --- |
| 263,358 | Great Britain | Dec. 30, 1926 |